Nov. 1, 1960  R. SAULNIER  2,958,480
AIRCRAFT WITH LOW ASPECT-RATIO WING
Filed June 22, 1954  6 Sheets-Sheet 5
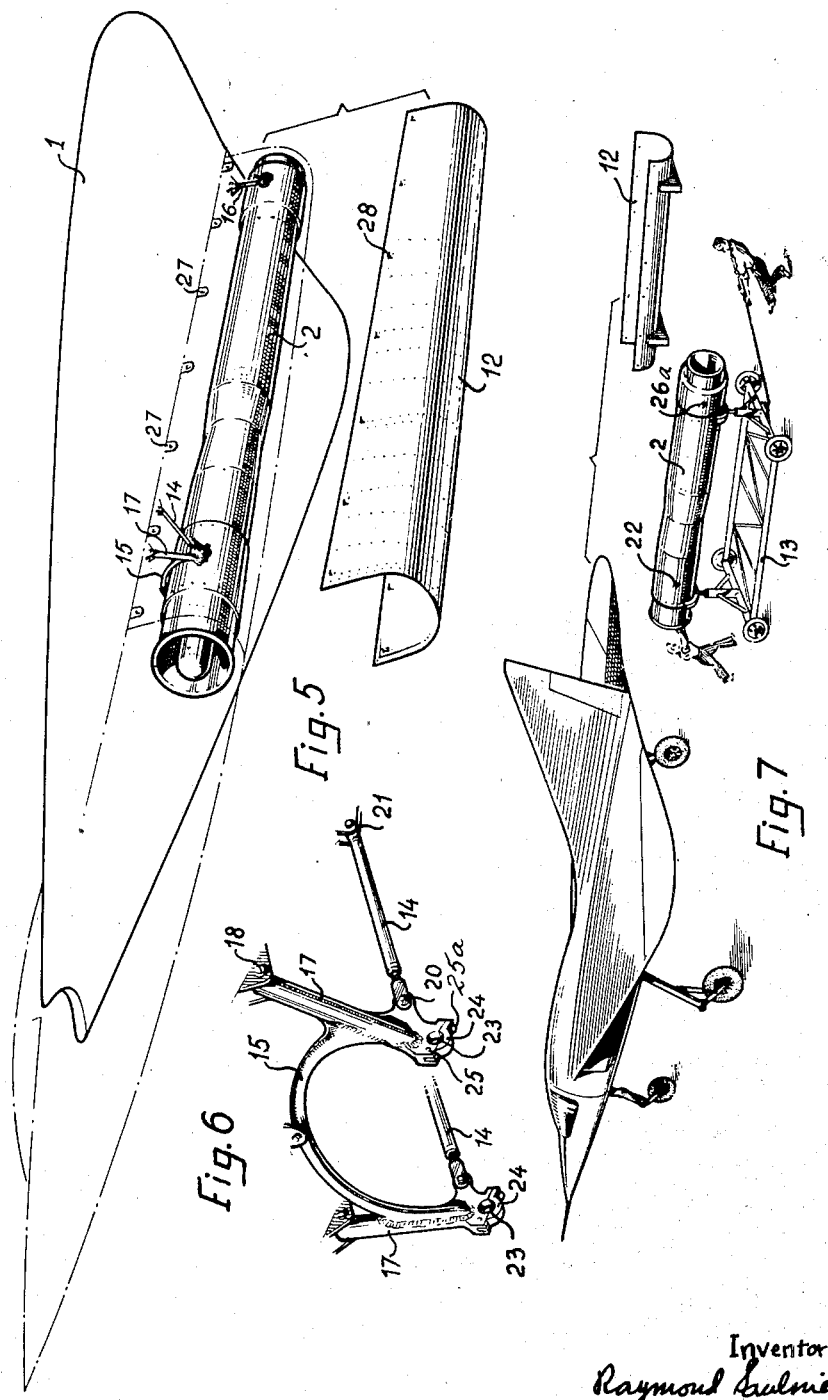

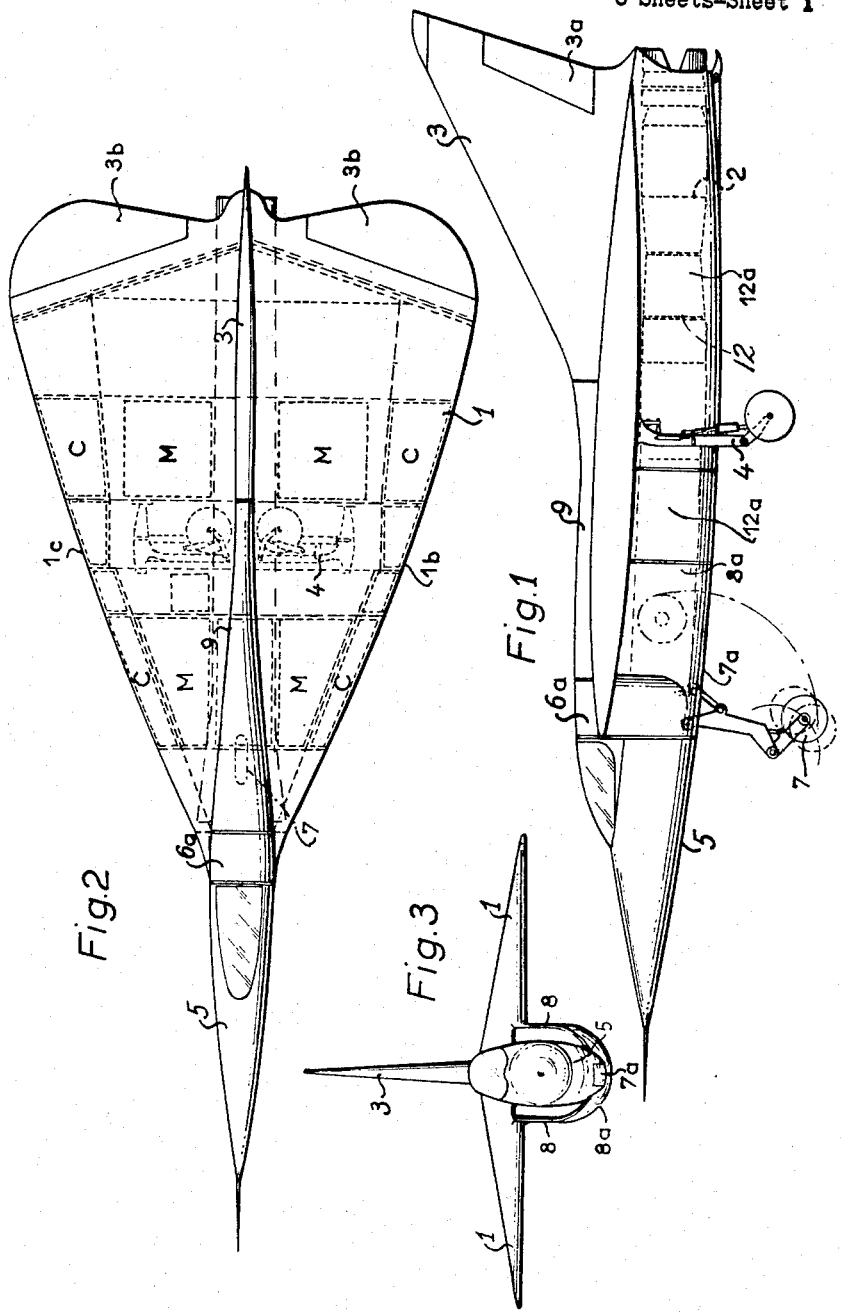

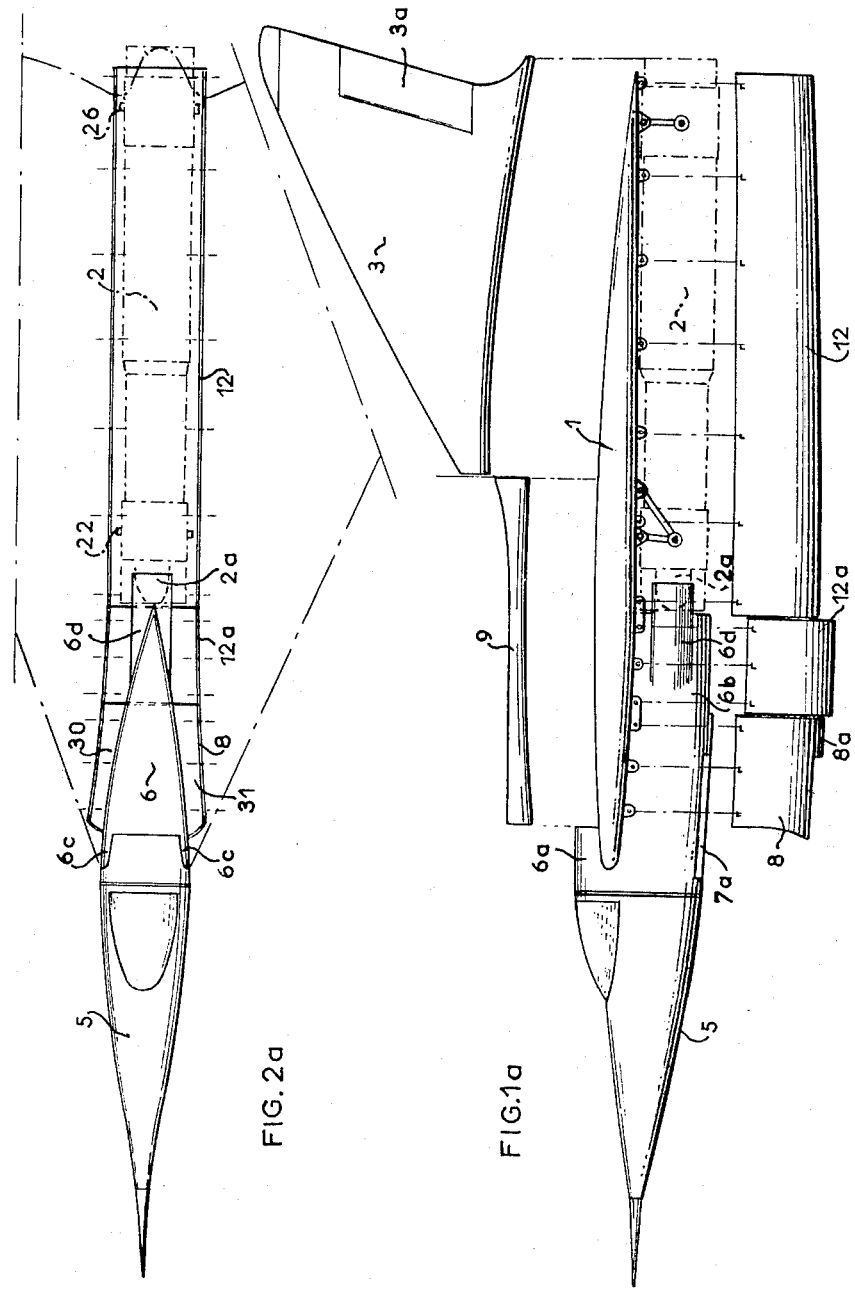

Nov. 1, 1960  R. SAULNIER  2,958,480
AIRCRAFT WITH LOW ASPECT-RATIO WING
Filed June 22, 1954  6 Sheets-Sheet 6
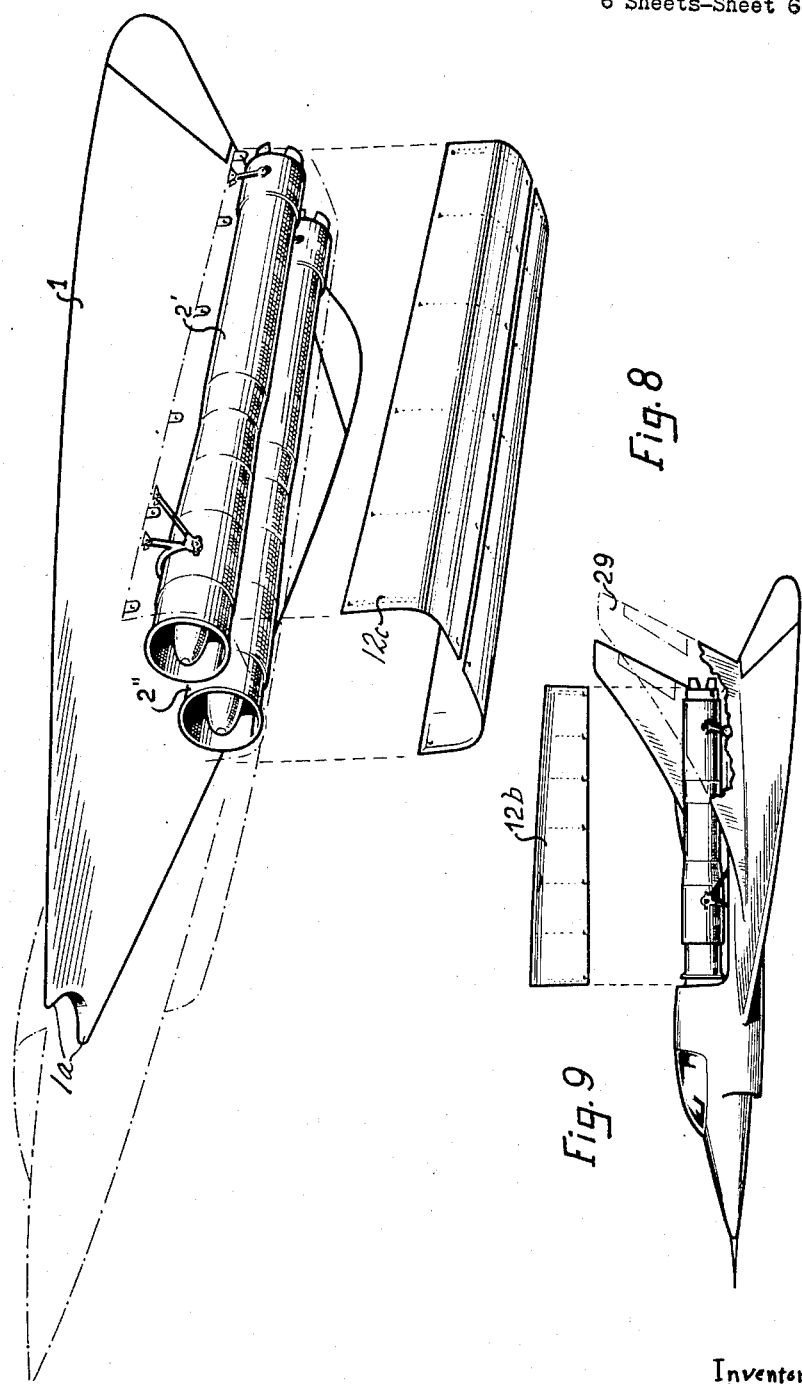
Inventor
Raymond Saulnier
by Brown & Seward
Attorneys

United States Patent Office 2,958,480
Patented Nov. 1, 1960

2,958,480

AIRCRAFT WITH LOW ASPECT-RATIO WING

Raymond Saulnier, 27 Faubourg St. Honore 8, Paris, France

Filed June 22, 1954, Ser. No. 438,566

Claims priority, application France June 30, 1953

6 Claims. (Cl. 244—15)

This invention relates to aircraft provided with a low aspect-ratio and, in particular, with a dart wing wherein the propelling means (jets or rockets) are located in the vicinity of the main vertical plane of symmetry of the aircraft.

Heretofore, in aircraft of this type, the propelling means have been incorporated in the wing or placed within the fuselage, and access to the propelling means is gained by way of removable or hinged skin panels. Now, the framework of modern aircraft is provided with a stressed skin that should be as continuous as possible if a suitable rigidity of said framework is to be ensured. Thus, it is only possible to provide in the stressed skin, for inspection, maintenance, or interchange of the jets or rockets, holes having a strictly limited area which makes these operations long and difficult.

It is also often the practice to make the entire rear fuselage detachable, so that the whole power unit is bared. However, with a low aspect ratio wing, the chord of which extends along a major portion of the length of the fuselage and, more particularly, with a dart wing, it is practically impossible, due to the very fact that the wing thus extends practically up to the rear end of the fuselage, to divide the aircraft framework into two sections.

Moreover, with the considerable length of the modern jets, such a division of the fuselage is practicable only if the jet pipe (and afterburner, if any) is so stressed as to be capable of hanging as an unsupported cantilever.

The invention has for its purpose to provide a light aircraft of simple construction offering easy and complete access to the jets or rockets, and permitting easy and quick mounting and removal of the same.

An object of the invention is therefore to provide an aircraft comprising, in combination, a dart wing, a cockpit attached to the front end of said wing and having its plane of symmetry coinciding with that of said wing, and a jet propulsion system, comprising one or more jet engines or one or more rockets, externally secured to said wing, the plane of symmetry of said jet system also coinciding with that of said wing.

With this arrangement, the wing may be constituted by a single box of comparatively reduced thickness, since the jet system is located outside the wing and since the fuselage is in fact constituted only by the cockpit secured in front of the wing, so that the wing longitudinal beams may be made in one piece.

The outer location of the jet system further offers the following advantages:

Inspection and maintenance of the jet system no longer gives rise to any difficulty since said jet system is perfectly accessible along its whole length.

It is obvious that the jet system must be protected by means of suitable fairing. But this only implies, for inspection and maintenance, the mere removal of non-stressed fairing surface portions.

As a further result of this access facility, the invention permits easy interchanging of one or more of the jet engines or rockets.

Another object of the invention is to secure the jet system on supports carried by the wing and so designed as to permit quick mounting and removal of one or more of the jets.

A more specific object of the invention is to provide said supports of the jet system with means to allow longitudinal thermal extension of the jet engines or rockets.

A still more specific object of the invention is to provide an aircraft of the type described, the pilot compartment of which is constituted by a forward part of a nacelle, the rearward part of which forms a structural element lockingly engaged and firmly secured on the front end of the wing and providing a stowage space adapted to receive, for instance, a retractable nose wheel, non-stressed cowlings interconnecting, above the wing, said pilot compartment with the vertical rudder, and fairing the jet engine under the wing, said cowlings being furthermore adapted to act as wind-sleeves for the jet engine.

Still a further object of the invention is to house in the above mentioned upper cowling interconnecting the cockpit with the vertical empennage the controls, wirings and pipings leading from the cockpit to the rear portion of the aircraft.

In this arrangement, the above mentioned nacelle-like structural element carries the front landing-wheel, while the wing carries the main under-carriage, the vertical empennage, the elevons and the fuel reservoirs.

It will be easily understood that such an arrangement facilitates jettisoning of the cockpit, that is only subjected to the stresses directly acting thereupon, which permits to lighten said cockpit, while making its dismantling easier.

Other objects and advantages of the present invention will be apparent from the following description, together with the accompanying drawings, submitted for purposes of illustration only and not intended to define the scope of the invention, reference being had for that purpose to the subjoined claims.

In these drawings:

Fig. 1 is a side view of an aircraft according to the invention having a dart wing and equipped with one single jet secured under the wing along the axis of symmetry of the aircraft.

Fig. 1a represents a side-elevational, partly exploded, view of the aircraft of Fig. 1, the landing gear being omitted;

Fig. 2 is a plan view of Fig. 1.

Fig. 2a represents a top plan view, corresponding to Fig. 2, but with the parts 1, 3 and 9 omitted;

Fig. 3 is an elevational view of said aircraft.

Fig. 5 is a schematic perspective view showing a jet engine suspended under a dart wing;

Fig. 6 is an enlarged perspective view of a support of the jet system;

Fig. 7 is a reduced general view of the aircraft of Figs. 1, 2, 3 showing the dismantling steps of the nacelle and jet;

Fig. 8 is a view similar to Fig. 5 showing an alternative embodiment in which the aircraft is equipped with two jet engines;

Fig. 9 is a perspective view of another alternative embodiment in which one single jet engine is mounted on the upper face of the wing.

Figure 4A:
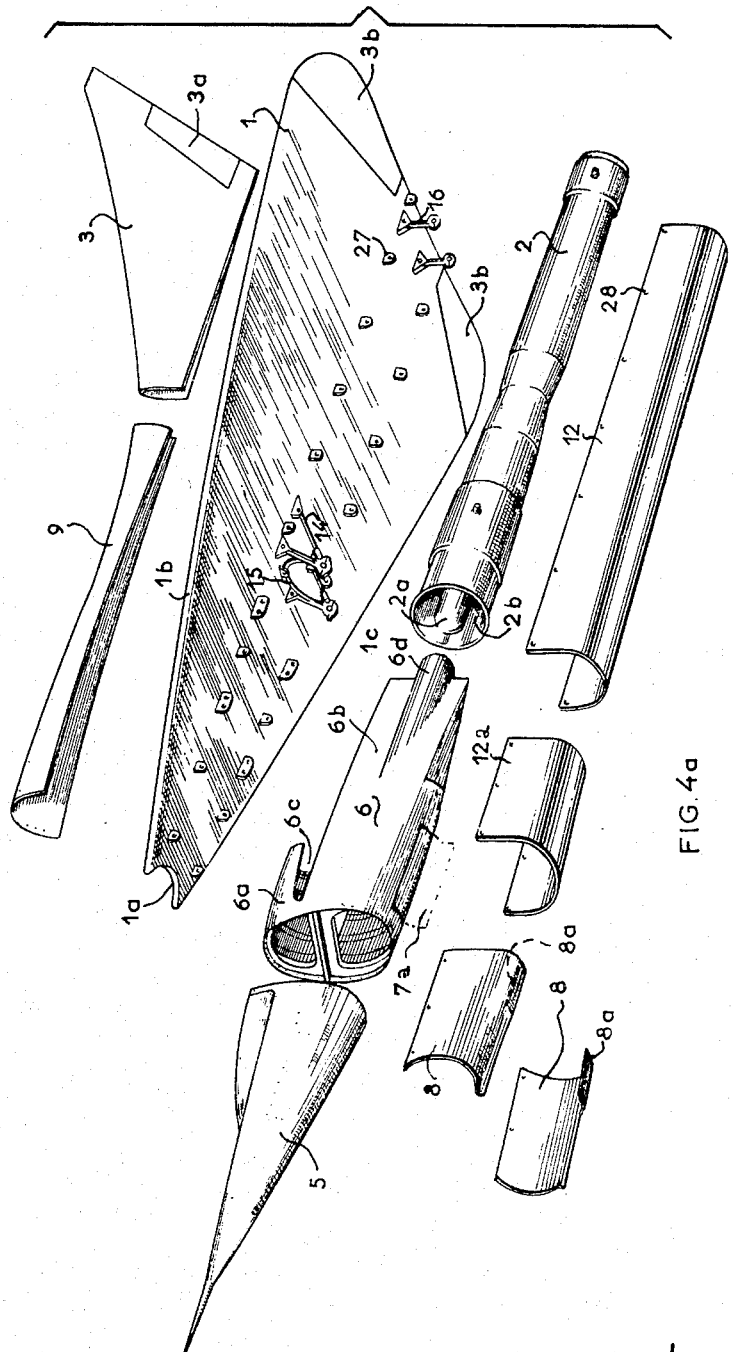
Fig. 4a represents, in perspective, an exploded view of all the major components of the aircraft except the landing gear.
Figure 4B:
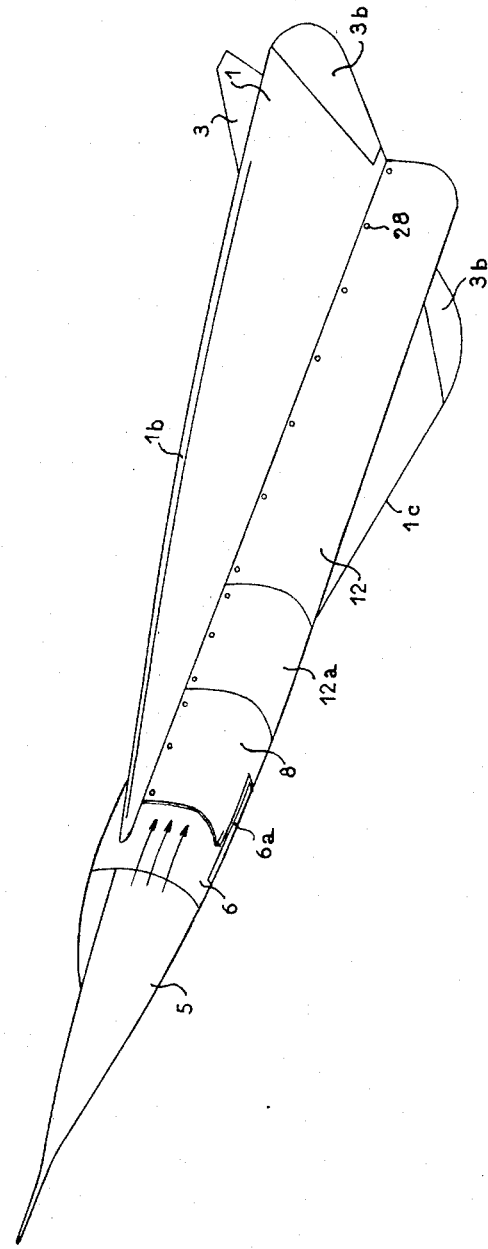
Fig. 4b represents, in perspective, the elements of Fig. 4a in properly assembled relation.

Referring to the drawings, and in particular to Figures 1 to 4b thereof, the tailless aircraft structure comprises a dart wing 1 having forwardly converging leading edges 1b and 1c, an upper fixed stabilizer fin 3, and vertical and horizontal direction control surfaces 3a and 3b, respectively, mounted on the rear of the wing 1 which supports, externally thereof, a conventional jet engine 2 comprising a conical centre-body 2a the apex of which is disposed forwardly of the leading edge of the intake 2b of the engine, a landing gear 4, and a nacelle removably connected to the lower surface of wing 1 and at the apex 1a of the forwardly converging leading edges 1b and 1c thereof so as to have its fore-and-aft axis positioned in the longitudinal central plane of wing 1 and parallel to the fore-and-aft center line thereo.

The nacelle comprises a forward part 5 providing a pilot compartment which projects ahead of the apex 1a of wing 1 and a rearward part constituted by a forwardly open structural element 6 having rearwardly converging lateral walls. The structural element 6 which provides a stowage room into which the nose wheel 7 of the aircraft may be retracted, comprises a front portion 6a of circular or elliptical cross-section, and a rear portion 6b of semi-circular or semi-elliptical cross-section. The front portion 6c of member 6 is provided with two substantially horizontal slots 6c adapted to receive the apex portion of wing 1, the lower edges of said slots being continuations of the upper edges of the walls of the rear portion 6a.

The bottom of the nacelle-like structural element 6 has an opening permitting the nose-wheel 7 to be retracted into said element. This opening may be closed by a door 7a and in order to permit swinging movement of this door, the cowling 8 is formed by two half-plates which are shaped in such a manner that their portions 8a contact each other so as to completely enclose a corresponding length portion of element 6, whereas the lower edges of the remaining portions of the half-plates are spaced from each other by a distance corresponding to the width of door 7a. The forward facing open ends of the half-plates form two ram air inlets respectively positioned on opposite sides of element 6, the continuous stream of the surrounding air received by said inlets being conducted to the mouth of motor 2 through the passages 30 and 31 defined by the cowlings 8 and 12a and the rearwardly converging side walls of the nacelle-like element 6.

The wing 1 has its tip engaged in the slots 6c provided in said interconnecting member 6 and constitutes together with the latter the resisting framework of the aircraft. As more clearly shown in Figs. 2a, 4a and 4b, the lower portion of the structural element 6 extends rearwardly along a considerable length and has a progressively tapering shape, so as to form, in cooperation with the cowling 8 and intermediate cowling 12a, the air intake ducts 30, 31 for feeding the jet 2. The latter is faired by means of the engine cowling 12 and intermediate cowling 12a, interconnecting the engine cowling with the cowling 8. All these cowlings have for their only purpose to fair the jet engine so as to give to the aircraft a suitable streamlined shape while providing around the jet a passage for cooling air. The forward edge of the semi-cylindrical engine cowling 12 and the adjacent rear edge of the semi-cylindrical intermediate cowling 12a have the same radius, but the radius of the forward end of cowling 12a, as well as the radius of cowling 8, increase in the forward direction in conformity with the increasing width of the nacelle-like element 6 so that the cowling portion 8 and the cowling 12a enclose a corresponding length portion of the rear portion 6b of the element 6 in spaced relation with the rearwardly converging side walls thereof to thereby define with these side walls the air inlet passages 30 and 31 leading to the mouth of motor 2.

Figs. 1a, 2a and 4a show clearly the tubular extension 6d of member 6, into which the centre body 2a of engine 2 is engageable.

Since the engine cowling 12 is only subjected to the stresses which are directly acting upon the same, it may be made far lighter than the usual fuselage, which, moreover, facilitates its dismantling, so as to give easy access to the jet engine along its whole length.

In the alternative embodiment shown in Fig. 8 wherein the aircraft is provided with two jet engines 2', 2" juxtaposed symmetrically on either side of the vertical plane of smmetry of the aircraft, said jets may be either faired as shown at 12c in Fig. 8, by means of two shells constituting when assembled a single cowling, or by means of two separate cowlings. The fairing of the aircraft is completed by an interconnecting cowling 9 (Figs. 1 and 4) extending between the upper rear edge of the interconnecting member 6 and the vertical empennage 3 and containing the controls, wirings, piping, etc., leading from the cockpit to the rear portion of the aircraft, so that inspection, maintenance or interchange of the jet or jets can take place without disturbing the arrangement of said controls wiring, etc. The positions of the fuel reservoirs are indicated, in broken lines, at C and M in Fig. 2.

The mounting of the jet system outside the wing either under the same, as shown in Figs. 5 and 8, or above the wings, as shown in Fig. 9, may be ensured by any suitable means within the scope of the invention. However, according to a preferred embodiment shown in Figs. 4, 5, 6 and 7, said mounting is obtained by means of supports 15 and 16. The support 15 which is used to secure the front end of the jet engine 2 comprises a stirrup-member completed by two arms 17 integral therewith and articulated on the aircraft about axes 18 and by two trusses 14 articulated on said stirrup-member at 20 and on the wing 1 at 21. This support thus constitutes a wholly rigid structure.

The jet system is secured to said structure by means of two diametrically opposed journals 22 provided for this purpose on the jet engine and engaged in bearings 23 provided at the lower ends of the arms of the stirrup-member. Said bearings include hinged portions 24 which permit, after said portions have been tilted about their axes 25, engagement with the journals, whereupon said hinged portions are set into position again and locked, e.g., by means of bolts 25a. The rear support 16 is merely constituted by two arms, both articulated on the wing and provided at their free ends with bearings of the type described with reference to the front support 15.

The jet engine is provided in the vicinity of its rear end with two journals 26a engaged in the bearings of the support 16. Due to the articulation of the arms 16 on the wing, the length variations of the jet, resulting from the temperature changes, can take place freely. The cowling 12 is provided with a plurality of holes 28 and corresponding lugs 27 are provided under the wing, said cowling being fixedly secured by means of bolts engaged through said holes 28 and lugs 27.

With this arrangement, it will be easily understood that it suffices to bring under the aircraft a carriage such as shown at 13 in Fig. 7, to unscrew the bolts 28 and to lay the cowling 12 down on the carriage to completely clear the jet engine along its whole length which permits easy inspection. To remove the jet proper after having brought under the aircraft a carriage, such as 13, it suffices to unscrew the bolts 25a, so as to tilt the lower half bearings 24 of the supports 15 and 16 around their axes 25, which releases the jet.

In the case when the jet propulsion system is mounted on the upper face of the wing, the vertical empennage 3 is conveniently substituted for by two separate fins 29, as shown in Fig. 9, mounted on the wing on either side of a cowling 12b surrounding the jet engine, or by a vertical empennage extending upwardly from the upper face of the wing.

It is also possible, within the scope of the invention, to arrange on the lower face of the wing suitable fins on either side of the cowlings or nacelle enclosing the jet system, when the latter is secured on said wing lower face.

It is to be understood that the invention is in no way limited to the examples shown and described and that it is subject to numerous modifications obvious to those skilled in the art without departing from the scope of the invention.

What is claimed is:

1. A tailless aircraft structure comprising a wing having forwardly converging leading edges and vertical and horizontal direction control surfaces, a nacelle and a jet propulsion engine both supported by said wing externally thereof and aligned parallel to the fore-and-aft center line of said wing, a jet engine cowling attached to said wing to enclose said engine substantially along its entire length, and cowling means attached to said wing and extending longitudinally from the forward end of said engine cowling along a rearward length portion of said nacelle, said cowling means enclosing said length portion in spaced relation to the lateral walls of said nacelle to define therewith a pair of air intake ducts for said engine.

2. A tailless aircraft structure comprising a wing having forwardly converging leading edges and vertical and horizontal direction control surfaces, a forwardly open nacelle-like structural element having rearwardly converging lateral walls, said element including a front portion of circular or elliptical cross-section supported by said wing at the apex of said leading edges and a rear portion of substantially semi-circular or semi-elliptical cross-section extending along one surface of said wing to a point intermediate said apex and the trailing edge of the wing, an airfoiled body section providing a pilot compartment connected to the open forward end of said structural element, a jet propulsion engine connected to said one surface of the wing with its mouth located adjacent the rear end of said rearwardly converging lateral walls of the structural element, an open ended and upwardly opening jet engine cowling attached to said one surface of the wing to enclose said engine substantially along its entire length, and cowling means attached to said one surface of the wing and extending forwardly from the forward open end of said engine cowling along a length portion of said structural element, said cowling means enclosing said length portion in spaced relation with said converging lateral walls to define therewith two ducts having each a forwardly facing ram air inlet.

3. A tailless aircraft structure comprising a wing having forwardly converging leading edges and vertical and horizontal direction control surfaces mounted on the rear of said wing, a jet propulsion engine positioned externally of said wing in the longitudinal central plane thereof and connected to the lower surface of the wing to extend from the trailing edge of the wing to a point substantially midway of the minimum chord of the wing, the forward part of said engine comprising a conical centre-body with its apex disposed forwardly of the leading edge of the intake of said engine, a forwardly open nacelle-like structural element having rearwardly converging lateral walls positioned externally of said wing in the longitudinal central plane thereof, said element including a front portion of circular or oval cross-section connected to said wing at the apex of said leading edges and a rear portion of substantially semi-circular or semi-elliptical cross-section extending along said lower surface of the wing to a point located ahead of said conical centre-body, a tubular member carried by said structural element and projecting from said rear portion thereof rearwardly and coaxially with said centre-body, said tubular member being engageable with said centre-body, an airfoiled body section providing a pilot compartment connected to the open forward end of said structural element, a substantially semi-cylindrical cowling attached to said lower surface of the wing to enclose said engine substantially along its entire length, and additional cowlings attached to said lower surface of the wing and extending longitudinally from said engine cowling along a length portion of said structural element, said additional cowlings enclosing said tubular member and said length portion in spaced relation with said rearwardly converging lateral walls of the structural element to define with said walls two ducts having each a forwardly facing ram air inlet.

4. A tailless aircraft structure comprising a wing having forwardly converging leading edges and vertical and horizontal direction control surfaces mounted on the rear of said wing, a nacelle and a jet engine both supported by said wing externally thereof and aligned in the longitudinal central plane of said wing, said nacelle including a rearward part having rearwardly converging lateral walls providing a stowage space and a forward part providing a pilot compartment, said rearward part including a front portion of circular or elliptical cross-section and an upwardly opening rear portion of semi-circular or semi-elliptical cross-section, said front portion being provided with a pair of horizontal slots the lower edges of which form continuations of the upper edges of said rear portion and the apex of said leading edges of the wing being engageable in said slots to thereby cover the open side of said rear portion by said wing and to support said nacelle at the apex of said leading edges of the wing.

5. A tailless aircraft structure comprising a wing having forwardly converging leading edges and vertical and horizontal direction control surfaces, a nacelle removably connected to the lower surface of said wing at the apex of said leading edges so as to have its fore-and-aft axis positioned in the longitudinal central plane of said wing and parallel to the fore-and-aft center line thereof, said nacelle having a forward part projecting ahead of said apex and providing a pilot compartment and a rearward part providing a stowage space and extending from said apex rearward to a point intermediate said apex and the trailing edge of said wing, a jet propulsion engine removably connected to said lower surface of said wing and positioned behind said nacelle so as to have its fore-and-aft axis in alignment with that of said nacelle, an open ended cowling for said jet engine coextensive therewith and removably attached to said lower surface of the wing to enclose said jet engine along substantially its entire length, an intermediate open ended channel-like cowling removably attached to said lower surface of the wing and extending coaxially with said engine cowling from the forwardly facing open end thereof to a point substantially midway of the maximum width of said nacelle, and another open ended channel-like cowling removably attached to said lower surface of the wing and extending coaxially with said intermediate cowling from the forwardly facing open end thereof to a point at or near the maximum width of said nacelle, said two last named cowlings being in spaced relation to the lateral walls of said nacelle so as to define with said lateral walls two air inlet ducts for said jet engine.

6. In an aircraft, the combination with a dart wing, of a cockpit removably secured to the front end of said wing with its vertical plane of symmetry coinciding with that of said wing and with its fore-and-aft axis extending parallel to the fore-and-aft center line of said wing, a jet propulsion engine, supporting means to carry said jet engine on the outer surface of said wing with its plane of symmetry also coinciding with that of said wing and with its fore-and-aft axis in alignment with that of said cockpit, said engine being provided near each end with a pair of diametrically extending, outwardly projecting journals, said supporting means being essentially constituted by a first support having two arms adapted to receive one terminal portion of said jet engine in straddling relation therewith, said first support being rigidly secured on the outer surface of said wing, and by a second support having two arms adapted to receive the other terminal portion of said jet engine in straddling relation therewith, each of said arms being articulated on said wing outer surface about an axis transverse to the fore-and-aft center line of the wing, and a quickly releasable locking means constituted by a bearing having a fixed portion integral with each arm of said supports and adapted to receive a corresponding one of said journals and a tiltable portion hinged on said fixed portion to removably lock said journal therein.

References Cited in the file of this patent

UNITED STATES PATENTS

| | | |
|---|---|---|
| 2,511,502 | Gluhareff | June 13, 1950 |
| 2,529,955 | Morley | Nov. 14, 1950 |
| 2,591,867 | Prower et al. | Apr. 8, 1952 |
| 2,675,196 | Marnay | Apr. 13, 1954 |
| 2,759,686 | Griffith | Aug. 21, 1956 |
| 2,763,426 | Erwin | Sept. 18, 1956 |

OTHER REFERENCES

"Aviation," issue of October 1945, pp. 172, 173.